(12) United States Patent
Smith et al.

(10) Patent No.: US 6,585,092 B1
(45) Date of Patent: Jul. 1, 2003

(54) MAGNETORHEOLOGICAL FLUID FAN DRIVE DESIGN FOR MANUFACTURABILITY

(75) Inventors: Anthony L. Smith, Troy, MI (US); Lawrence Craig Kennedy, Commerce Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/043,749

(22) Filed: Jan. 9, 2002

(51) Int. Cl.[7] .............................................. F16D 35/00
(52) U.S. Cl. ...................... 192/21.5; 192/58.4
(58) Field of Search ............... 192/21.5, 58.4, 192/58.61, 110 B

(56) References Cited

U.S. PATENT DOCUMENTS

| | | |
|---|---|---|
| 5,667,715 A | 9/1997 | Foister |
| 5,960,918 A | 10/1999 | Moser et al. |
| 6,032,772 A | 3/2000 | Moser et al. |
| 6,102,177 A | 8/2000 | Moser et al. |
| 6,149,832 A | 11/2000 | Foister |
| 6,173,823 B1 | 1/2001 | Moser et al. |
| 6,318,531 B1 * | 11/2001 | Usoro et al. ................ 192/21.5 |
| 2002/0088411 A1 * | 7/2002 | Stretch et al. ............ 123/41.12 |

* cited by examiner

Primary Examiner—Saul Rodriguez
(74) Attorney, Agent, or Firm—Kathryn A. Marra

(57) ABSTRACT

An improved magnetorheological (MR) fluid fan drive design is disclosed. A critical area in the design of such fan drives is the gap for MR fluid between the rotor ring and the corresponding structure of the stator. The stator member must confine the MR fluid in the gap and the applied magnetic field for the fluid and the field coil close to it. In this disclosure a ferrous alloy stator insert is made as one piece and cast within a larger aluminum alloy stator body. A slot for the rotor ring is cut through stator insert separating it into two pieces that remain supported by the aluminum body. The magnetically permeable insert pieces confine the fluid and the magnetic field at the fluid gap around the rotor, and one of the stator insert pieces supports the field coil next to the gap.

11 Claims, 4 Drawing Sheets

MAGNETORHEOLOGICAL FLUID FAN DRIVE DESIGN FOR MANUFACTURABILITY

TECHNICAL FIELD

This invention pertains to making viscous clutch assemblies. More particularly, this invention pertains to the design of robust and more readily manufacturable, continuously controllable, magnetorheological fluid fan drive assemblies.

BACKGROUND OF THE INVENTION

U.S. Pat. Nos. 5,960,918; 6,032,772; 6,102,177; and 6,173,823, each entitled "Viscous Clutch Assembly," describe clutches for a vehicle cooling fan assembly that use a magnetorheological (MR) fluid as the viscous material operating in a gap between the engine driven rotor and the fan carrying stator. The assembly further includes a coil for creating an electromagnetic field in the gap to vary the yield stress of the MR fluid and, thus, the speed of the fan.

U.S. Pat. No. 5,667,715 entitled "Magnetorheological Fluid" and U.S. Pat. No. 6,149,832 entitled "Stabilized Magnetorheological Fluid Compositions" describe viscous fluids suitable for use in the viscous clutch assemblies. Often these fluids comprise suitable, finely divided iron particles suspended in a nonpolar vehicle. The fluids are formulated to resist particle separation even under high separation force applications and they typically function as Bingham fluids. In an ambient gravitational field, but in the absence of a magnetic field, they display a shear stress that increases generally linearly as the shear rate on the fluid is increased. When magnetorheological Bingham fluids are subjected to a magnetic field, the shear stress vs. shear rate relationship is increased so that substantially more shear stress is required to commence shear of the fluid. This characteristic is very useful in controlling the transfer of torque between a rotor and stator in a viscous fluid clutch assembly.

In engine driven fan drive systems of the type described the speed of the fan is continuously variable by varying the magnetic flux in the MR fluid. Such variable speed fan drive assemblies provide vehicle fuel economy improvement, noise reduction, powertrain cooling improvement and cost reduction. After evaluation and testing of fan drive assemblies such as those described in the above four patents for a specific truck application it is realized that further improvements could be made. It is an object of this invention to provide improvements in the design of certain fan drives for the purpose of their ease of manufacture and robustness of operation.

SUMMARY OF THE INVENTION

As described in the "Viscous Clutch Assembly" patents identified above, a fan drive assembly has an engine driven input shaft with an attached hub and rotor assembly. This input assembly applies torque to a fan drive assembly using a viscous fluid, preferably a magnetorheological fluid such as those described in the above cited patents. Accordingly, the input and output structures are designed with complementary rotating portions that fit closely together with a thin layer of torque transmitting, MR fluid between them.

Also positioned close to this fluid gap is an electric coil for generating a variable magnetic field in the fluid to vary its yield stress and, thus, the torque transmitted from the input shaft/rotor assembly to the fan drive. A separate computer based controller determines the voltage or current flow applied to the coil. Experience with such fan drive mechanisms reveals the advantage of careful design of the complementary fluid gap forming portions of the input and fan drive assemblies and the means taken to seal in the MR fluid. This invention provides several such related improvements enhancing the ease with which the fan drive is made and the robustness of the drive.

In accordance with a preferred embodiment of the invention, a viscous fluid clutch for a vehicle cooling fan drive comprises a driving shaft/rotor assembly enclosed by a fan housing and a fan cover assembly. The fan housing is carried on the driving torque input shaft but separated from the shaft with respect to torque transmission by a bearing. A fan cover assembly that is attached to the fan housing includes a clutch stator insert that receives the rotor and the MR fluid for the transmission of torque.

The fan cover assembly includes a fan cover body, a fan cover insert and an annular coil body with coil windings. The coil body is carried on the circular, ferrous metal fan cover insert that, in turn, is preferably cast in place within the fan cover body. This assembly is co-axial with the input shaft.

The fan cover insert has a larger diameter than the coil and the outer region of the insert contains a slot in which the rotor is received during assembly of the drive. The slot and the rotor ring leave gaps on both sides of the rotor for the MR fluid. And the magnetic permeability of the ferrous composition on both sides of the slot confines the magnetic field of the coil on the MR fluid in the gaps.

One important feature of the invention is the method by which the fan cover assembly is made. The fan cover insert is made as a single round, disc-like precursor piece, preferably by hot forging a steel billet. The fan cover body is cast around the hot forged insert precursor using a suitable aluminum alloy. Anchoring features are formed on the fan cover insert to prevent separation from the cover body. Further processing of this composite part includes machining a circular slot through the insert for the rotor. This operation divides the round insert into two parts, both of which are anchored in the aluminum body portion of the composite. The separated portions of the insert define a slot for the rotor and MR fluid and provide magnetically permeable regions to concentrate the magnetic field in the fluid.

Additional machining of the fan cover insert provides a circular channel to receive the coil body and to provide a passage for the coil leads to a non-rotating assembly for supplying power to the coil. Additional machining of the fan cover body provides for improved sealing engagement with the fan housing member.

Other objects and advantages of the invention will become more apparent from a detailed description of preferred embodiments which follows.

DESCRIPTION OF THE PREFERRED EMBODIMENT

Figure 1:
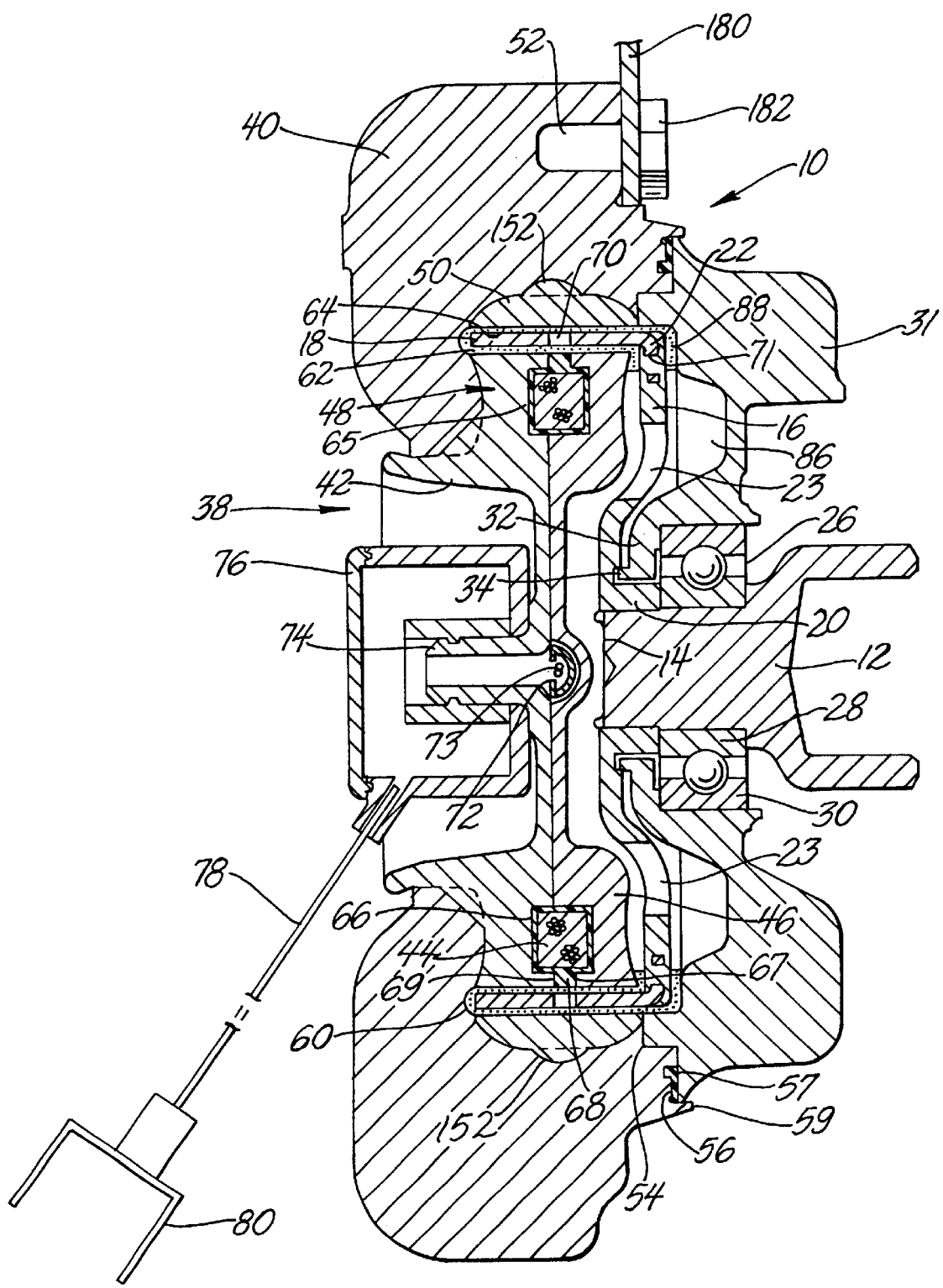
FIG. 1 is a side elevation view, partly in section, of a fan drive in accordance with the invention.

Reference is first made to FIG. 1 in which a fan drive assembly is shown in side sectional view.

The complete drive assembly is indicated at 10. It comprises an input shaft 12. Input shaft 12 is suitably made of steel and it is driven by the engine of the vehicle, e.g., using the water pump pulley. Accordingly, the speed of the input shaft is engine speed or proportionately higher in accordance with the pulley ratio for the water pump.

Affixed to the end 14 of input shaft 12 is a hub 16 for rotor 18. Hub 16 has a central rim 20 tightly engaging the end 14 of input shaft 12. Hub 16 then extends radially to enclose the rim portion 22 of rotor 18. Rotor 18 is preferably made of a magnetically permeable ferrous material such as a low carbon steel alloy. The hub is made of aluminum and, as will be described further below, is cast so that it encloses the rim portion 22 of rotor 18. The hub 16 also has a plurality of holes 23 to reduce the weight of the hub.

Thus, input shaft 12, hub 16 and rotor 18 constitute an input shaft/rotor assembly for the vehicle fan drive 10.

Ball bearing 26 is affixed at its inner race 28 to shaft 12. Affixed to the outer race 30 of ball bearing 26 is an aluminum fan housing 31. Fan housing 31 has a radially inner rim portion 32 which extends around the front edge of bearing 26. Additionally, the housing 31 has a neck portion 34 that lies radially and axially close to, but spaced from, the rim portion 20 of hub 16 to form a labyrinth sealing path to prevent MR fluid from entering the bearing 26.

The fan housing 31 is isolated by bearing 26 from torque application by input shaft 12.

Still referring to FIG. 1 a fan cover assembly 38 includes a cast aluminum fan cover body 40, a fan cover insert 42, coil body 44 and coil cover 46.

Fan cover insert 42 is preferably made of magnetically permeable ferrous material such as a low carbon steel alloy. As seen in FIG. 1 it includes an inner wheel portion 48 and an outer ring portion 50. As will be described in more detail in connection with FIGS. 2, 3, and 4, fan cover insert 42 is preferably initially made as one piece and then machined so that ring portion 50 is separated from wheel portion 48.

Fan cover body 40 comprises a plurality of boltholes 52 for attachment of fan hub 180 and bolts 182 (see also FIG. 5) and fan blades which are not shown in these figures. Fan housing 31 and fan cover body 40 each contain corner structures at their area of contact, generally 54, so as to provide a labyrinth sealing surface between them and to provide a pilot surface for radial alignment of fan cover assembly 38 with fan housing 31. Further, fan cover body 40 has a circular pocket 56 to provide for a polymeric sealant 57 to be molded in pocket 56 between fan cover body 40 and fan housing 31.

In the operation of fan drive assembly 10, rotor 18 rotates in a slot 60 through fan cover insert 42. The inner wheel portion 48 of fan cover insert 42, thus, defines a gap 62 with the inner surface of rotor 18, and the outer ring portion 50 of fan cover insert 42 defines a gap at 64 with the outer surface of rotor 18.

In the FIG. 1 sectional view, coil body 44 sits in a circular channel 66 in fan cover insert 42. The other side of coil body 44 is enclosed by a round coil cover 46. The coil body 44 is clamped by fan cover insert 42 at area of contact 69 and by coil cover 46 at area of contact 67. Areas of contact 67 and 69 must form a seal to prevent leakage of MR fluid. A suitable electrically insulating, non-magnetic encapsulating material 65 (a commercial material from DuPont called Zenite is suitable) applied around the coil body 44 has a protrusion 68 that prevents a shunt in the magnetic field between the coil cover 46 and the inner wheel portion 48. Coil cover 46 is spot welded to inner wheel portion 48 at locations not shown.

In order to simplify its manufacture and to prevent a shunt in the magnetic field, a series of discontinuous slots 70 are formed in rotor 18. Furthermore, to improve the bond between the rotor 18 and the cast hub 16 a series of holes 71 are formed in the rim portion 22 of rotor 18 to provide interlocking contact between the cast aluminum hub 16 and the rotor 18 which increases the mechanical strength between them. Joining these parts by insert casting, rather than pressing and pinning, for example, improves heat transfer between them by essentially eliminating contact thermal resistance.

Coil body 44 has a diametric arm 72 through which coil leads 73 are led into the central post region 74 of insert 42. Post 74 also carries a bearing, not shown, which carries a non-rotating slip ring assembly 76. Slip ring assembly includes slip rings, brushes, brush holders, a retaining clip and a Hall effect sensor and target to measure fan speed. These features are known and used in the art and, therefore, are not illustrated to simplify FIG. 1.

Leading to the slip ring assembly 76 is a tether 78 terminated by an electrical connector 80 through which electrical power is conducted to slip assembly 76 and the leads 73 of the coil body 44. The electrical connector 80 interfaces to the vehicle electrical harness. When electrical power is applied to the coil body 44 a magnetic field is formed in the gaps 62 and 64 between the rotor 18 and the insert wheel portion 48 and insert ring portion 50. A suitable MR fluid 88 is provided in gaps 62, 64 and its yield stress increased for torque transmission by the application of the magnetic field. Accordingly, input shaft 12 and the connected hub 16 and rotor 18 are turning at an input speed determined by the engine or the water pump pulley system. As power is provided to the coil body 44, the formation of the magnetic field causes a yield stress increase in the MR fluid 88 enabling torque to be transferred between the rotor 18 and fan cover insert portions 50 and 48 to thereby drive the fan cover assembly 38.

In addition to the design provisions that provide improved sealing of the MR fluid 88 within the drive assembly there are features of the invention which improve the manufacturability of the fan cover assembly 38.

Figure 2:
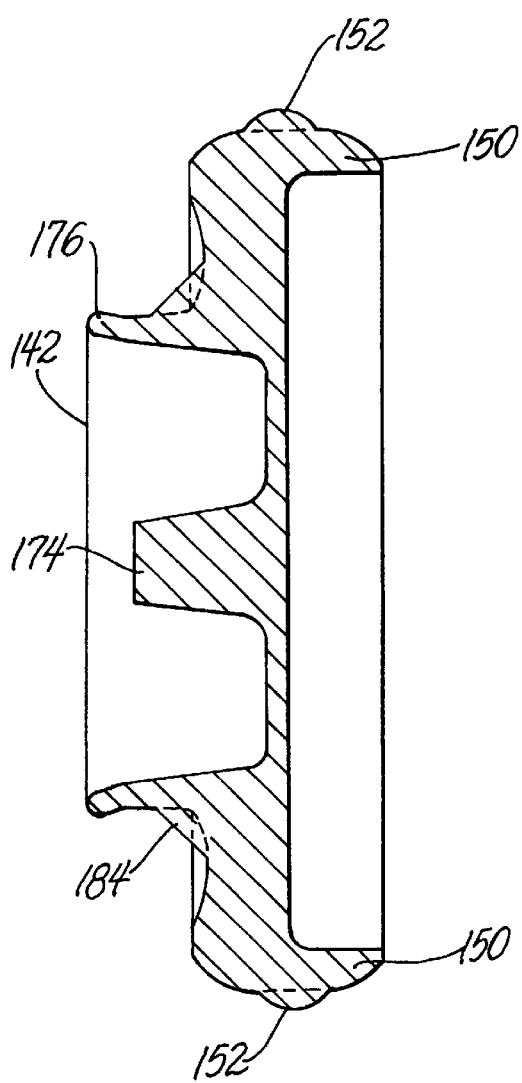
FIG. 2 is a side view, in section, of the ferrous metal (steel) insert, as initially made, of the stator portion of the drive shown in FIG. 1.
Figure 3:
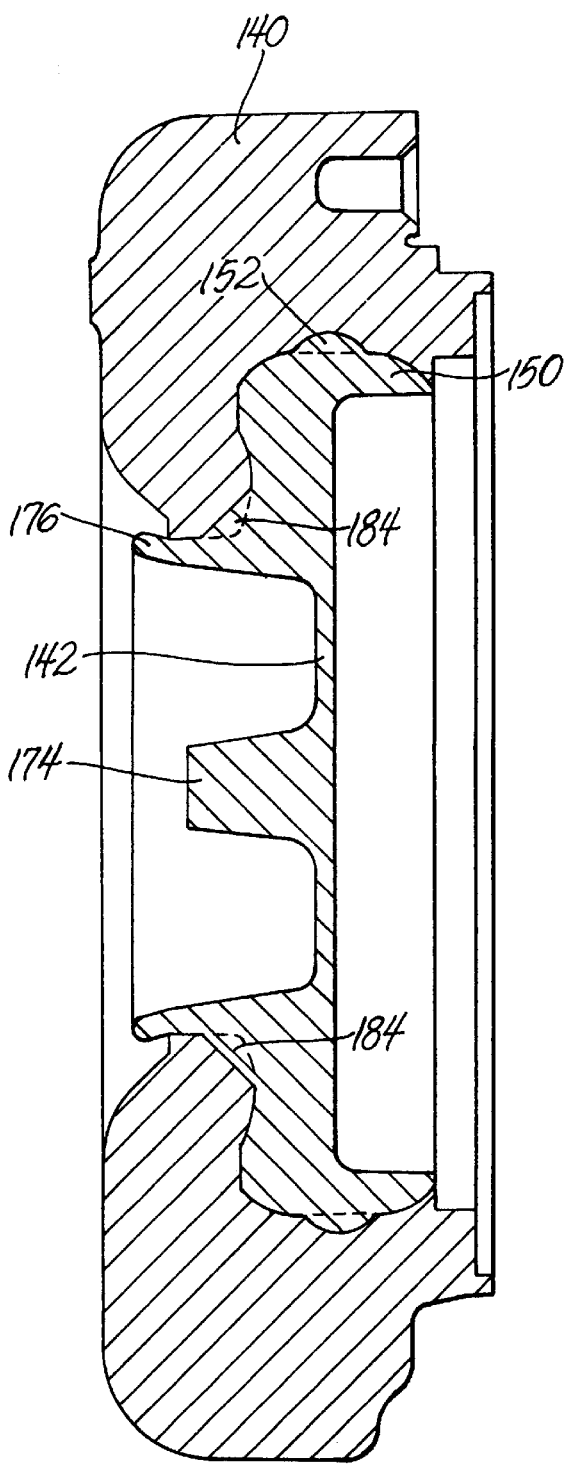
FIG. 3 is a side view in section of the insert of FIG. 2 cast into an aluminum cover assembly.
Figure 4:
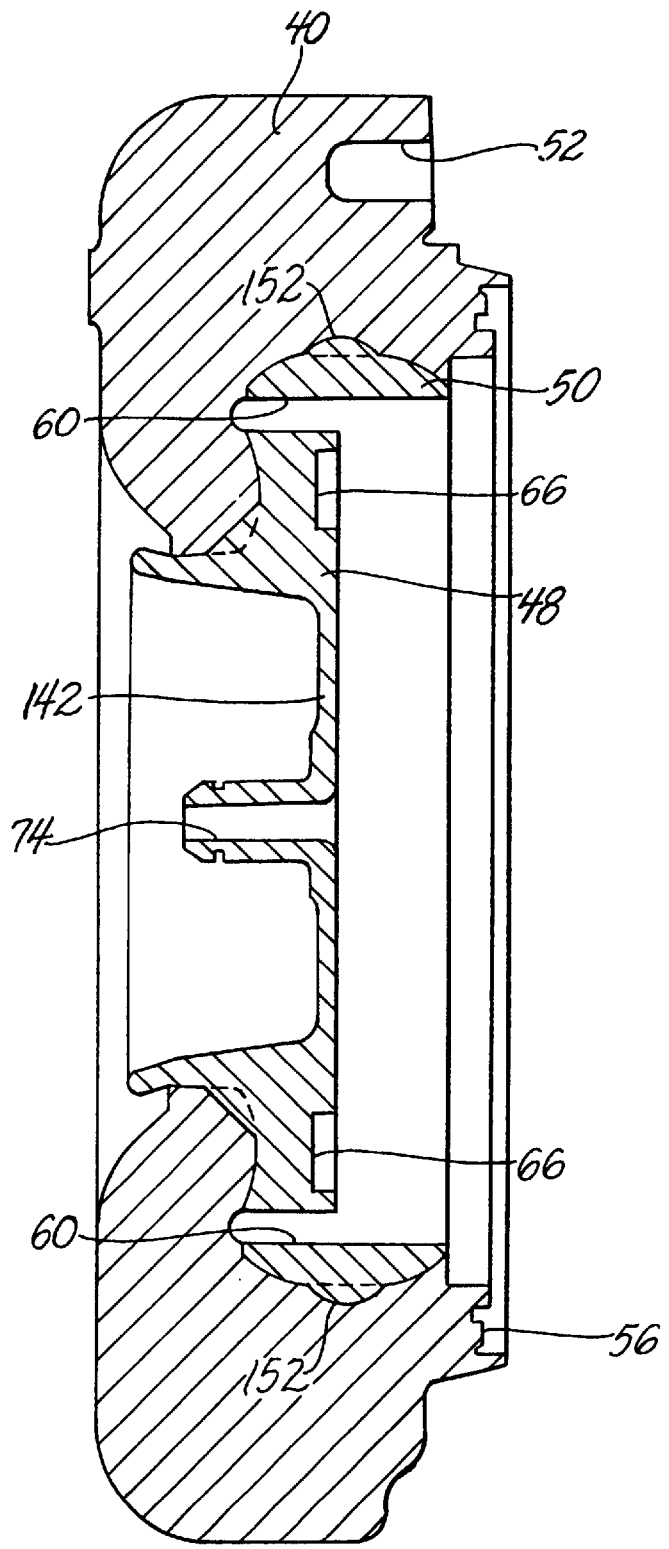
FIG. 4 is a side view, in section, of the cover member of FIG. 3 after machining.

A fan cover insert precursor piece 142 is shown at succeeding stages of its transformation to a fan cover insert 42 in FIGS. 2, 3, and 4. In FIG. 2 the insert precursor 142 is shown in its initially formed condition. Preferably, the insert precursor 142 is formed as a single wheel-like piece by hot forging a suitable steel alloy blank. As thus formed, insert precursor 142 includes a central hub portion 174 which ultimately becomes the coil lead post 74 of fan cover insert 42. Insert precursor 142 also includes a lip portion 176 for later contact with a cast around fan cover body 40. Following hot forging, lip 176 is further formed or machined outwardly to anchor fan cover body 40 from axial separation.

The outer ring portion 150 of insert precursor 142 is formed with four lugs 152 (two shown in the sectional views of FIGS. 2–4) spaced at ninety degrees on its circumferential portion for subsequent interlocking mechanical engagement with cast aluminum cover body 40. Also formed on the body of fan cover insert precursor 142 are four fillets 184 (two shown in FIGS. 2–4) spaced at ninety degrees at the base of lip 176. Like lugs 152, fillets 184 are for locking the later cast, fan cover body precursor 140 from separation from fan cover insert 42.

Referring now to FIG. 3 the aluminum fan cover body precursor 140 is seen cast in place around the steel insert precursor 142. The fan cover body precursor 140 is seen cast around the lugs 152 on the ring portion 150 of insert precursor 142. The fan cover body precursor is also cast over fillets 184. Thus, cast-in-place fan cover body precursor 140 is anchored against axial and radial separation from fan cover insert precursor 142 by lugs 152 and fillets 184. The slight outward curvature of lip 176 also serves to retain fan cover body 40 against fan cover insert 42.

FIG. 4 shows the fan cover insert 42/fan cover body 40 composite structure after machining of the corresponding precursor portions of FIG. 3. An important difference is that slot 60 has been cut completely through the single piece precursor body 142 insert body to form fan cover insert ring portion 50 and fan cover insert wheel portion 48 as separate pieces. The advantage of this separation is to prevent shunting of the magnetic field in the gaps 62, 64 and to provide end clearance for the rotor 18. As seen in FIGS. 1 and 4, the now separate ring 50 and wheel 48 portions of the fan cover insert 42 are held in place by the cast around fan cover body 40. Upon assembly of the fan drive, slot 60 receives the rotor structure 18 as shown in FIG. 1.

The shape of fan cover insert 42 and its higher melting composition permits the fan cover body 40 to be cast around portions of it. This is an important feature of the invention because fan cover insert precursor 142 is formed as a single piece and fan cover body precursor 140 is cast around it before the insert precursor 142 is machined into two pieces. The manufacture of the fan cover insert wheel 48 and insert ring 50 are greatly simplified because they remain held in place by fan cover member 40 and do not require handling or complex handling effort during assembly of the fan drive 10. The four lugs 152 help to retain insert ring 50 in the fan cover member 40 and fillets 184 and lip 176 help to retain fan cover insert wheel 48 in the fan cover member 40. Also, cutting slot 60 after the insert casting process allows for more precise geometric tolerances to be maintained with respect to the relative positions of the slot 60, insert wheel portion 48 and insert ring portion 50.

A further comparison of FIGS. 3 and 4 shows the machining of the precursor composite 142, 140 to form the lead post 74, a circular channel 66 in insert wheel 48 for the coil body 44 and sealant pocket 56 in cover 40.

Figure 5:
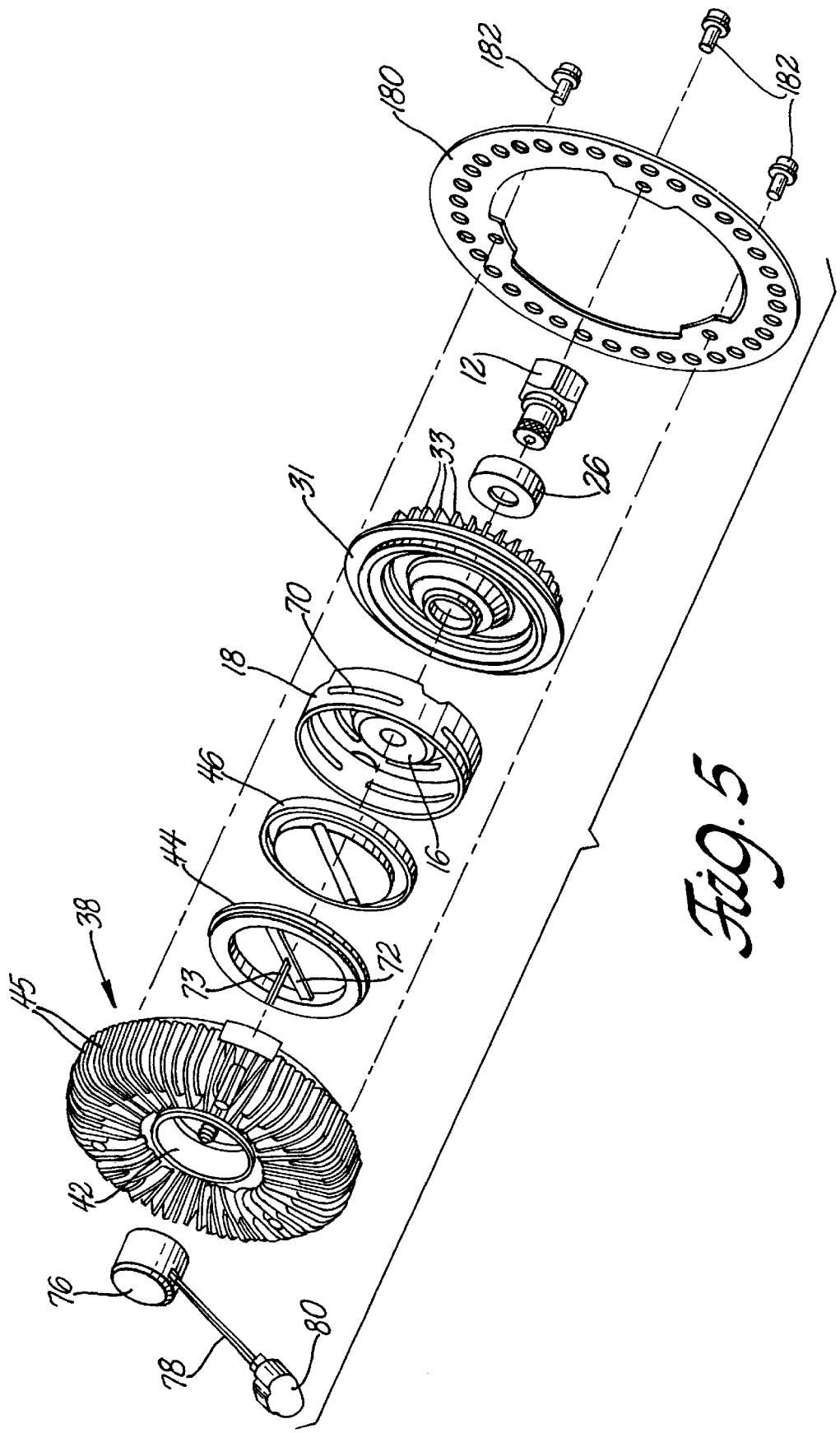
FIG. 5 is an assembly view of the fan drive shown in FIG. 1.

FIG. 5 is an exploded assembly view of the fan drive assembly 10. FIG. 5 thus complements the FIG. 1 side sectional view of the assembly 10. FIG. 5 includes fan hub 180 and self tapping bolts 182 for attaching hub 180 and blades, not shown, to fan cover assembly 38, specifically fan cover body 40 at bolt holes 52 (FIG. 1).

FIG. 5 better illustrates the cooling fins 33 on fan housing 31 and cooling fins 45 on fan cover body 40. Although a "lockup" condition between rotor and stator is possible the viscous fluid clutch typically operates with a difference in speed (termed slip) between the input shaft/rotor assembly and the fan housing/cover assemblies. When slipping, the shearing of the MR fluid in the gaps produces heat in the drive assembly and the cooling fins help to dissipate it.

During assembly and operation of the fan drive assembly 10 the MR fluid 88 typically stays in gaps 62 and 64 since the MR fluid 88 is a Bingham fluid which has a non-zero yield stress with no fluid shear. However, in the event the MR fluid 88 slumps when the fan drive assembly is not rotating, the reservoir 86 is sized such that there will not be MR fluid intrusion into the bearing 26.

Thus, a vehicle fan drive assembly has been developed and described that is relatively easy to manufacture. It also provides improved sealing of the MR fluid within the drive and better confinement of the magnetic field in the region between rotor and stator where the fluid is intended to function. The invention has been described in terms of specific embodiments but it is apparent that other forms of the invention could be adapted by those skilled in the art. Accordingly the scope of the invention is to be considered limited only by the following claims.

What is claimed is:

1. A viscous fluid, fan clutch for a fan drive assembly, said viscous fluid clutch comprising a rotor assembly comprising (i) an input shaft having a fan drive end, (ii) a cast metal hub attached to said shaft at said fan drive end, coaxial therewith, and extending radially to a circular perimeter and (iii) a ferrous metal, rotor ring having a first edge incorporated into the perimeter of said cast hub, coaxial with said input shaft, and extending axially to a second edge in a direction from the drive end of said input shaft;

a bearing having inner and outer races and fixed on its inner race to said input shaft;

a circular fan housing coaxial with said input shaft and fixed to the outer race of said bearing, said housing extending radially past said rotor ring and defining a viscous fluid gap between said housing and rotor; and a fan drive cover assembly comprising (i) an annular non-ferrous metal fan cover body with an edge in sealing engagement with said fan housing outboard of said rotor, and (ii) a circular ferrous metal fan drive cover insert having a circumferential surface in sealing engagement with the inner annular surface of said fan cover body, and a flat surface spaced axially from the end of said input shaft; said fan cover insert initially being made as a single piece, said nonferrous fan cover body being cast against the circumferential surface of said fan cover insert in forming said fan drive cover assembly and said assembly being thereafter machined axially through the radially outer portion of said fan cover insert to separate a fan cover insert ring portion from a fan cover insert wheel portion and to form a slot through said fan cover insert into said fan cover body to receive said rotor and thereby to define a gap on both radial surfaces and around said second edge of said rotor between slot surfaces of said fan cover insert for a viscous fluid.

2. A viscous fluid, fan clutch drive assembly as recited in claim 1 comprising integral portions on each of said fan cover insert ring portion and said fan cover wheel portion for mechanical interlocking with said cast fan cover body.

3. A viscous fluid, fan clutch for a fan drive assembly as recited in claim 1, further comprising an annular coil body with coil windings for generating an electromagnetic field in said gaps, said coil body being sealed against said flat surface of said insert with a coil cover and spaced from said end of said input shaft and coaxial therewith.

4. A viscous fluid, fan clutch for a fan drive assembly as recited in claim 3 in which said annular coil body comprises a nonmagnetic sealing material between said coil cover and said insert body surface to prevent a magnetic field shunt between said coil cover and said insert.

5. A viscous fluid fan clutch for a fan drive assembly as recited in claim 1 in which said ferrous metal rotor ring comprises discontinuous, central, circumferential slots.

6. A viscous fluid, fan clutch for a fan drive assembly as recited in claim 5 in which said rotor ring further comprises a perforated rim for interlocking mechanical and heat transfer contact with said cast hub.

7. A viscous fluid, fan clutch for a fan drive assembly as recited in claim 1 in which said circular fan housing engages said hub in a non-contact labyrinth seal against viscous fluid intrusion into said bearing.

8. A viscous fluid, fan clutch for a fan drive assembly as recited in claim 1 in which the sealing engagement between said fan cover body and said fan housing comprises both a labyrinth seal structure and a molded seal.

9. A viscous fluid, fan clutch for a fan drive assembly as recited in claim 1 in which the viscous fluid gap between said fan housing and said rotor interconnects with the viscous fluid gap at the outer radial surface of said rotor and said fan drive cover.

10. A viscous fluid, fan clutch for a fan drive assembly as recited in claim 9 in which said fan housing, fan cover assembly, hub and rotor cooperate to form a continuous viscous fluid gap around both inner and outer surfaces of said rotor.

11. A viscous fluid, fan clutch for a fan drive assembly as recited in any of claims 1–10 in which said viscous fluid comprises a magnetorheological fluid.

* * * * *